March 3, 1953 C. G. HAWKS 2,630,058
AUTOMATIC POPCORN POPPING AND DISPENSING MACHINE
Filed April 24, 1951 3 Sheets-Sheet 1
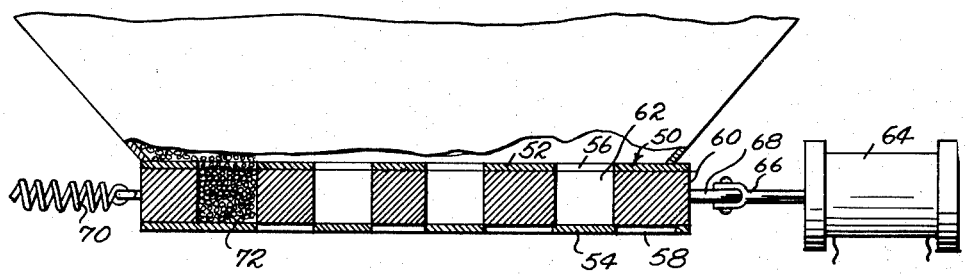
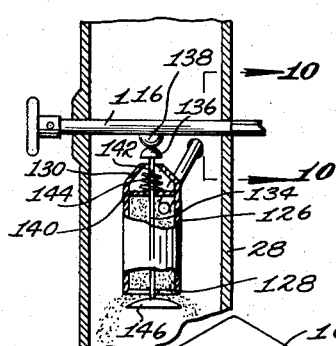
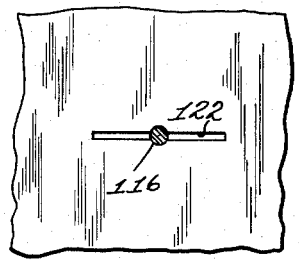
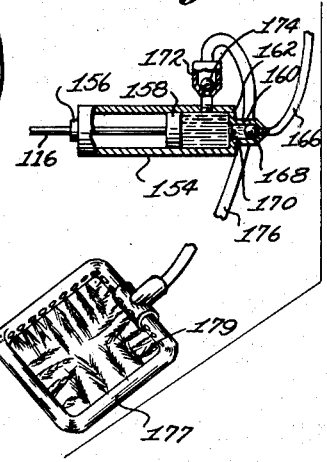
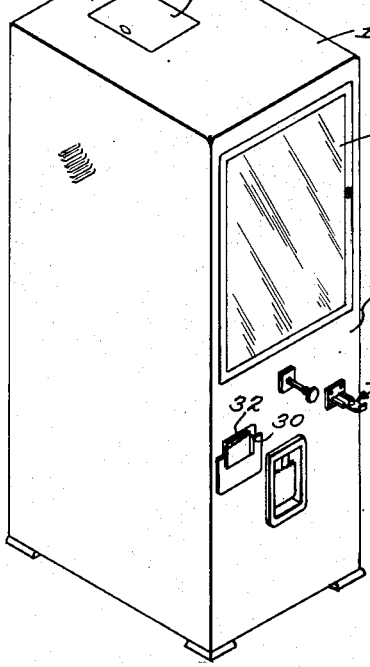
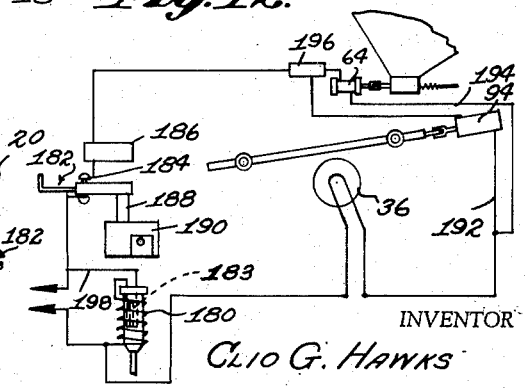
INVENTOR
CLIO G. HAWKS
BY
McMorrow, Berman & Davidson
ATTORNEYS March 3, 1953　　　C. G. HAWKS　　　2,630,058
AUTOMATIC POPCORN POPPING AND DISPENSING MACHINE
Filed April 24, 1951　　　3 Sheets-Sheet 2

INVENTOR
CLIO G. HAWKS
BY
McMorrow, Berman & Davidson
ATTORNEYS

March 3, 1953        C. G. HAWKS        2,630,058
AUTOMATIC POPCORN POPPING AND DISPENSING MACHINE
Filed April 24, 1951        3 Sheets-Sheet 3

INVENTOR
CLIO G. HAWKS

BY
McMorrow, Berman + Davidson
ATTORNEYS

Patented Mar. 3, 1953

2,630,058

UNITED STATES PATENT OFFICE 2,630,058

AUTOMATIC POPCORN POPPING AND DISPENSING MACHINE

Clio G. Hawks, Minnebago, Minn.

Application April 24, 1951, Serial No. 222,607

4 Claims. (Cl. 99—238.6)

This invention appertains to improvements in automatic corn popping machines and has for its primary object to provide a coin operated corn popping machine, wherein a predetermined amount of corn kernels will be subjected to an instantaneous heat, immediately upon the insertion of a coin in the machine.

Another object of this invention is to provide an infrared lamp for heating the corn kernels, which are disposed on a reciprocating metallic screen over the infrared lamp, the screen radiating heat to the kernels and to provide a reflector hood, which overlies the screen and reflects the heat rays, emanating from the infrared lamp, back onto the kernels.

Another object of this invention is to provide a solenoid operated valve mechanism for discharging a predetermined amount of corn kernels from a hopper onto the reciprocating screen and to provide means for separating the unpopped kernels from the popcorn, after the kernels have been thoroughly subjected to the rays emanating from the infrared lamp.

A further object of this invention is to obviate the necessity for using oil or similar agents in any manner, attendant with the popping of the corn, and to provide means for salting and oiling the popped kernels as they fall from the screen into a bag or container.

And yet another object of this invention is to provide a coin operated popcorn machine, wherein the discharge of the kernels onto the screen, the reciprocating of the screen, and the operation of the infrared lamp are automatically initiated and controlled by a time mechanism, attendant with the coin switch.

Yet another object of this invention is to provide an efficient and inexpensive popcorn popping machine, where the operation of the popping mechanism is visible exteriorly of the casing for the machine.

These and ancillary objects and structural features of merit are attained by this invention, the preferred embodiment of which is set forth in the following description and illustrated in the accompanying drawings, wherein:

Figure 1 is a view in perspective of a popcorn machine, constructed in accordance with the principles of this invention;

Figure 8 is a fragmentary sectional view, illustrating the valve mechanism operatively associated with the hopper;

Figure 9 is a fragmentary sectional view of the discharge funnel, illustrating the salting mechanism in longitudinal vertical section;

Figure 10 is a detailed sectional view taken on line 10—10 of Figure 9;

Figure 11 is a perspective showing of the mechanism provided for oiling or buttering the popcorn;

Figure 12 is a diagrammatic view of the electrical wiring arrangement.

Figure 2:
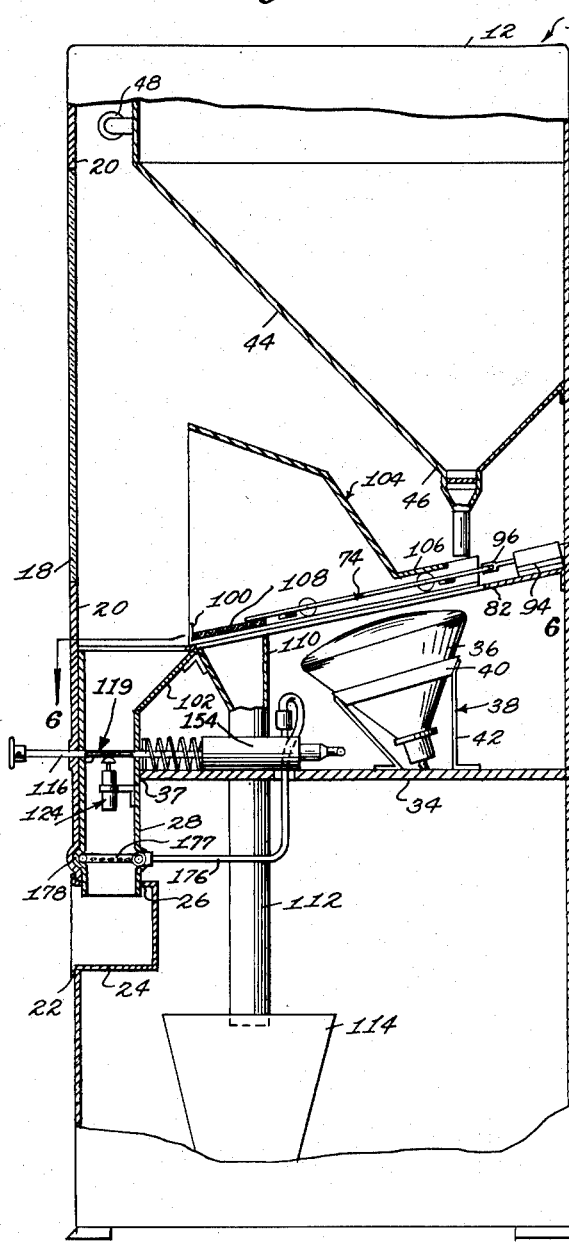
Figure 2 is a longitudinal vertical sectional view, through the casing.
Figure 3:
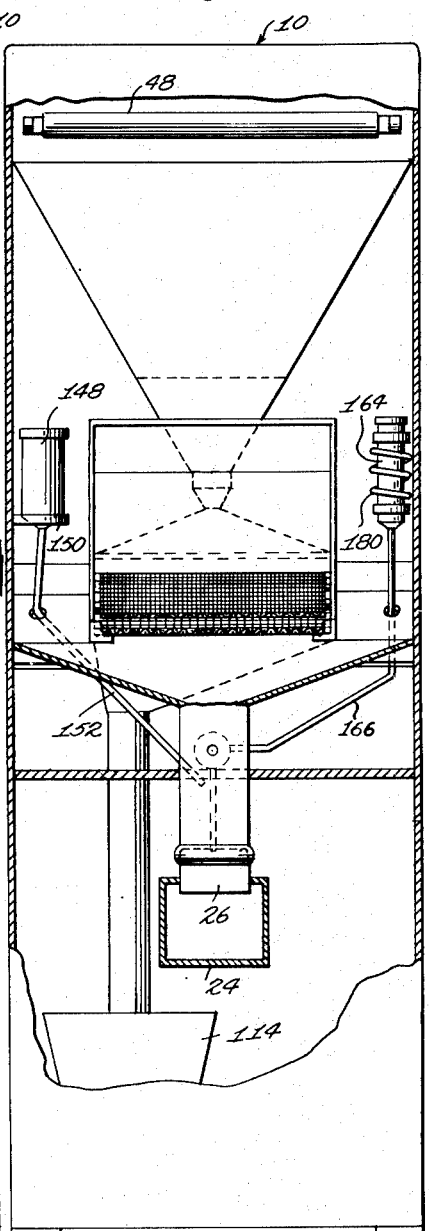
Figure 3 is a front elevational view, with the front of the casing being removed and exposing the operating mechanism.
Figure 4:
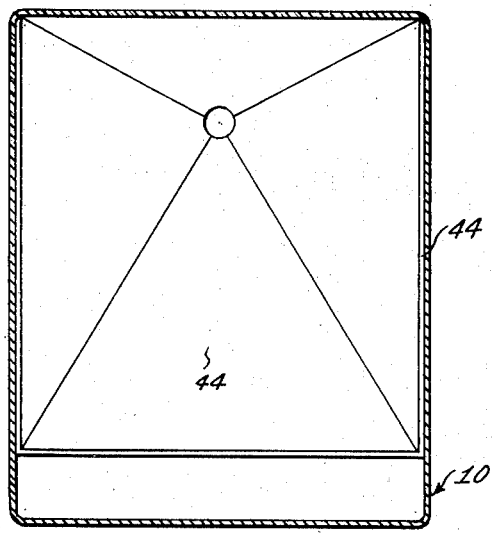
Figure 4 is a top plan view.
Figure 5:
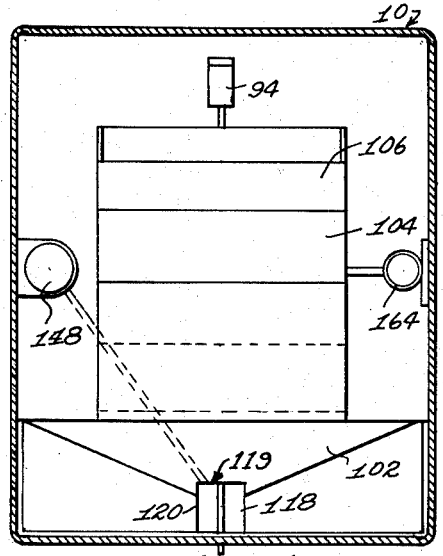
Figure 5 is a top plan view, with the top wall of the casing being removed.
Figure 7:
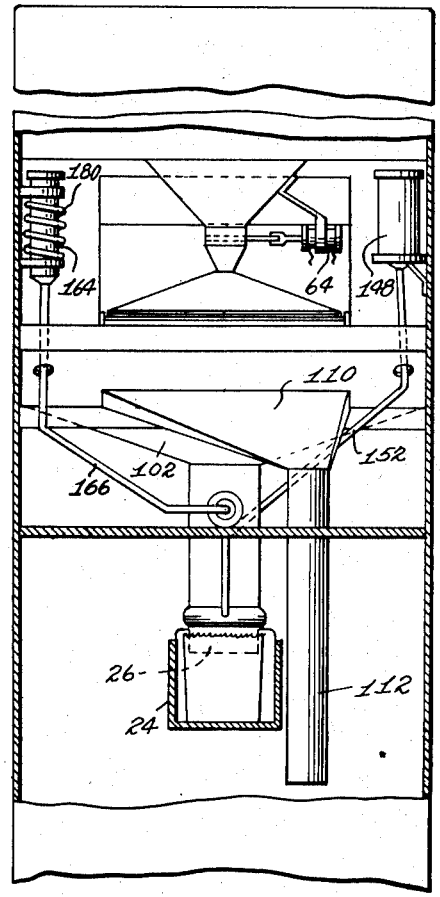
Figure 7 is a fragmentary front elevational view, with the front wall being partly broken away.
Figure 6:
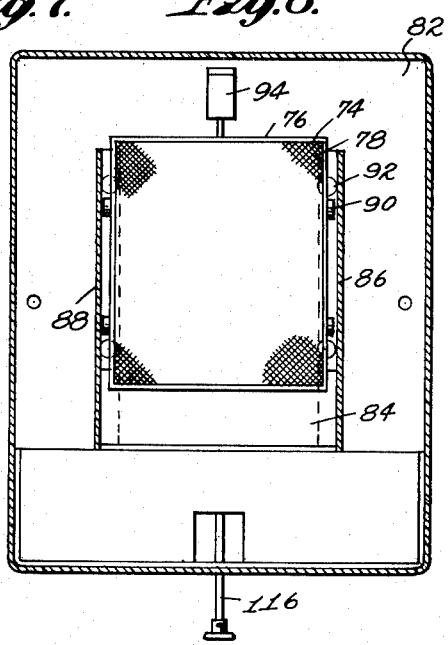
Figure 6 is a transverse sectional view taken on line 6—6 of Figure 2.

Referring now more particularly to the accompanying drawings, the corn popping and dispensing machine 10 includes a casing 12, which may be suitably formed and configured. The casing includes a top wall 14, which is formed with an opening provided with a closure 16, which provides access interiorly of the casing. A transparent and heat resistant panel 18 is mounted in the front wall 20 of the casing, exposing the internal operation mechanism, so that a user can watch the corn being popped and dispensed. An opening 22 is formed in the front wall, below the panel 18 and a receptacle or box 24, having an open front wall, is disposed through the opening and fixedly mounted on the front wall. The box is formed with an apertured top wall 26, adapted to receive the lower end of a discharge tube or funnel 28. A casing 30, which has an open front wall, is mounted in the front wall 20 of the casing 14 for retaining a plurality of bags 32, which are arranged in collapsed and stacked formation.

A transverse partition 34 is fixedly mounted in the casing, between the side walls thereof and is spaced from the front wall, as at 37, to receive the discharge tube 28. A conventional infrared lamp 36 is mounted by a supporting frame 38 on the partition 34 and is disposed at an angle, within the casing. The frame 38 includes a collar 40, which is circumposed on the bulb and supporting legs 42, which extend from the collar and are fixedly mounted on the upper surface of the partition.

A supply hopper 44 is mounted between the opposing side walls and rear wall of the casing, the hopper being vertically arranged within the casing and having a reduced lower discharge end 46. The hopper is spaced from the front wall 20 of the casing and a fluorescent lamp 48 is mounted thereon, above the transparent panel 18 to illuminate the interior of the casing, so that the operation of the machine can be easily visible exteriorly of the casing. A fixed tube 50 is transversely mounted in the discharge end 46 of the hopper and is formed with an upper end 52 and a spaced lower end 54. The upper end is provided with spaced openings 56 and the lower end 54 is provided with openings 58, which are out of registry with the openings 56, as seen in Figure 8. A valve member 60 is slidably disposed in the tube and is formed with openings 62, which are normally in alignment with the openings 56. A solenoid 64 is mounted in the casing and operates an arm 66, which is pivoted to an extending lug 68 on one end of the valve member. A spring 70 is affixed to the opposing end of the valve member for retaining the valve member in position, so that the openings 56 will align with the openings 62. However, upon actuation of the solenoid 64, the arm 66 is moved inwardly in the solenoid casing, with the solenoid plunger, and the kernels 72, collected in the openings 62, are discharged through the openings 58 and gravitate onto a reciprocating screen 74. The screen 74 includes an open frame 76, within which a fine copper mesh screen 78 is mounted. A floor or plate 82 is mounted between the side walls and the rear wall of the casing, the plate being disposed at an angle and extending downwardly toward the front wall. The plate is formed with an opening 84, underlying the screen 74 and the edges of the opening are defined by upstanding flanges 86 and 88. The frame 76 is formed with vertically and horizontally arranged rollers 90 and 92, which are engageable on the guide rails 86 and 88, so that the screen is slidably mounted on the plate 82. A vibrating mechanism 94, such as a motor and eccentric connection or solenoid arrangement, is mounted on the plate 82, adjacent to the rear end of the casing, and, through a connecting arm 96, is attached to the rear end of the frame 76 for reciprocating the screen. An upstanding stop member 100 is formed on the front end of the plate, which rests on the rear edge of a collecting hopper 102, the hopper being formed integral with the tube 28. The hopper 102 is disposed between the side walls and abuts the front wall of the casing, as seen in Figure 2, and the stop extends upwardly from the rear edge of the hopper, so as to limit the forward movement of the screen 74.

A coarse screen 108 is transversely disposed across the forward portion of the opening and partially underlies the screen 74, the coarse screen 108 overlying a discharge hopper 110 for unpopped kernels. The hopper 110 is formed integral with a vertical tube 112, which extends into a receptacle 114 mounted on the bottom of the casing.

A hood type heat reflector 104 bridges the opening 84 and faces the screens 74 and 108 and the lamp 36. A fixed plate 106 is positioned in superimposed spaced relation with respect to the portion of the screen 74 adjacent to the lower or discharge end 46 of the supply hopper 44 and forms with this portion of the screen 74 a restricted passage for controlling the flow of unpopped kernels from the supply hopper to the screen 74.

Thus, as the kernels are discharged through the openings 58, to the screen 78, which is reciprocated by the vibrating mechanism 94, the kernels are subjected to the heat rays emanating from the infrared lamp 36. The kernels are also subjected to the heat collected and given off by the copper screen 78 and by the heat, reflected downwardly from the overlying hood reflector. The kernels are thus popped, as the screen is reciprocated and the popped corn is discharged into the hopper 102, with the unpopped kernels falling through the screen 108 into the hopper 110 and eventually into the receptacle 114.

A rod 116 is slidably disposed through an opening in the front wall of the casing and through an aligned opening in the front wall of the tube 28. The rod 116 carries laterally extending plates 118 and 120 intermediate its ends which are adapted to be disposed within the tube 28 and form a gate valve therein to collect the popcorn before releasing the entire load at once. A slot 122 is formed in the back wall of the tube 28 for receiving the plates, as the rod is pushed forwardly into the casing, to permit the popcorn to gravitate downwardly in the tube 28. As the rod is pushed forwardly, it actuates a mechanism for discharging salt in the tube 28. The salt discharging mechanism 124 includes, as seen in Figure 9, a cylinder 126, which is formed with an open bottom wall 128 and a substantially closed top wall 130. A rod 134 is axially disposed in the cylinder and terminates at its upper exterior end in a semi-spherical knob 136, which is adapted to be engaged by a complementary knob or protuberance 138, formed on the underside of the rod 116 which is retained free from rotation by the plates, sliding through the slot 122. A partition wall 140 is transversely formed in the upper end of the cylinder and is provided with a central opening for slidably receiving the rod 134. A lateral pin 142 is formed on the rod and provides an abutment for a coiled spring 144, which is concentrically disposed on the spring and bears against the upper surface of the partition 140. A concavo-convex valve plate 146 is carried transversely by the lower end of the rod and is adapted to close off the open end wall 128 of the cylinder, so as to retain the salt within the cylinder. However, upon engagement of the protuberance 138 with the knob 136, the rod will be depressed and the valve plate 146 will be moved downwardly, permitting the salt to gravitate outwardly from the casing 126.

A supply casing 148 is mounted by means of brackets 150 to one of the side walls of the casing and is communicated with the casing 126 by means of a flexible tubing 152. Thus, the casing 126 is constantly filled with salt, which gravitates from the supply casing 148 through the conduit 152.

A cylinder 154 is fixedly mounted on the partition 34 and interposed in the path of axial movement of the rod 116, which is slidingly and sealingly disposed through the end wall 156 of the cylinder. A piston 158 is formed on the end of the rod 116 and is workably disposed in the cylinder 154, which is adapted to contain a predetermined quantity of melted butter or similar seasoning oils. An inlet nipple 160 is formed in the opposing end 162 of the cylinder and is communicated with a supply tank 164 by means of a flexible conduit 166. A ball valve 168 is disposed in the nipple and is retained from entering the cylinder by means of a fine screen 170, enclosing the opening in the end wall 162 of the cylinder.

An outlet nipple 172 is formed in the upper wall of the cylinder, adjacent to the end wall 162 and a check valve 174 is disposed therein, the check valve 174 being unseated by the increased fluid pressure in the cylinder, upon the movement of the piston 158 toward the end wall 162, under the actuation of the sliding rod 116. A flexible conduit 176 is connected to the nipple 172 and to a dispensing ring 177, which is seated in a recess 178 formed in the walls of the tube 28. The dispensing ring 177 is rectangular in shape, so as to conform to the cross sectional shape of the tube 28 and is formed with inwardly directed discharge openings 179. The oil, dispensed from the cylinder, by the piston 158 is discharged through the openings 179, in cross sprays and transversely to the gravitational path of the popcorn.

A heating coil 180 is concentrically disposed on the tank 164 and a thermostat 183 is immersed in the oil in the tank and connected to the coil 180 for controlling the operation thereof, dependent upon the condition of the fluid in the tank.

A coin mechanism 182 is mounted in the front wall of the casing and controls a switch 184, which is also controlled by a relay timer 186. A coin chute 188 underlies the coin switch 184 and is connected to a coin box 190.

As seen in Figure 12, the vibrator mechanism 94 is wired in a circuit 192, controlled by the switch 184 of the relay timer 186, with the lamp 36 being wired in the circuit 192. The solenoid 64 for the valve mechanism in the hopper is connected by a conductor 194 to the circuit 192 and is controlled by a timer switch 196. The heating coil 180 for the supply tank 164 is provided with a separate circuit 198, extending from the common source of electrical energy.

In use, corn kernels are deposited in the hopper 44, through the closure 16, which may be provided with a suitable locking mechanism. The corn popping machine is then ready for use, when a coin is inserted in the coin mechanism 182. The coin, of course, controls the circuit for the various operating mechanisms and, upon the insertion of the coin, the timer 196 is operative to energize the solenoid 64 and move the member 60, so as to release the pocketed kernels 72 onto the underlying screen. After the solenoid 64 is energized, the time relay 196 is operative to close off the circuit 194 and the spring 70 returns the member 60 to its normal position, as illustrated in Figure 8. The circuit 192 is then energized, through the relay 196, and the vibrating mechanism 94 is set into operation. Of course, it will be noted that the infrared lamp 36 is illuminated when the circuit 194 is established and is retained in operation, through the circuit 192.

As the screen is vibrated in the trackway, the infrared lamp emits its rays through the screen 74 and the screen, being of conductive material, is operative to heat the corn kernels. Of course, the overhead reflector hood is operative to reflect the rays back down onto the screen, as it is reciprocated in a path underlying the hood.

The popped corn and the unpopped kernels gravitate downwardly on the screen, as it is reciprocated, the unpopped kernels falling through the coarse screen 108 and being collected in the receptacle 114, while the popped corn is collected in the hopper 102. The popped corn is retained by the gate valve 119 formed by plates 118 and 120, so that it is collected in the hopper, above the rod 116. The timer 186 is operative to control the extent of operation of the vibrating mechanism 94 and the lamp 36 and, after a predetermined period, the relay 186 is operative to close off the circuit 192 and, therefore, extinguish the lamp 36 and shut off the vibrator mechanism 94.

The popped corn on the baffle or gate valve 119 is released, to gravitate into a bag disposed in the chamber 24, by sliding the rod 116 inwardly, the baffle moving through the slot 122 in the rear wall of the hopper. As the rod 116 is moved inwardly, the abutment member thereon contacts the knob 136 for the valve mechanism for the salt dispenser and, as the popped corn gravitates downwardly in the hopper, the salt is sprinkled thereon. Also, as the rod slides inwardly, the piston on the inner end thereof is operative to discharge the oil in the cylinder 154 downwardly through the flexible connecting tube or conduit to the nozzle 176. Thus, as the corn falls through the nozzle, the oil is sprayed from the nozzle onto the corn.

When the push rod 116 travels back into position after being released, its striker 138 makes a quick hit with the salt striker 136 thus allowing a very small portion of salt to fall on the top of the popcorn in the customer's container. This amount is much less than allowed to drop or mix with the popcorn on the forward movement of the rod when the push button was operated by the customer because the spring returns the rod very quickly.

Having thus described this invention, what is claimed is:

1. A corn popping machine comprising a closed housing including a front wall, a fixed inclined floor extending across the interior of said housing intermediate the top and bottom thereof and having its lower end spaced from said front wall, an opening formed in said floor extending inwardly from said lower end thereof and terminating at a point adjacent to the upper end of said floor, a first screen arranged parallel to said floor and overlying a portion of said opening and connected to said floor for reciprocating movement, a second screen arranged parallel to said floor and overlying the remaining portion of said opening and fixedly secured to said floor, the perforations in said first screen being of a size to retain the popped and unpopped kernels of corn and the perforations in said second screen being of a size to retain the popped kernels and permit the passage of the unpopped kernels therethrough, a vertically disposed supply hopper positioned above said first screen and having its lower end located adjacent the upper end of said first screen, radiant heating means secured to said housing beneath the portion of said opening accommodating said first screen, a heat reflector bridging said opening and facing said first and second screens and said heating means, a collecting hopper arranged between the lower end of said floor and said front wall and beneath said lower end of said floor for receiving the popped kernels, a receptacle positioned within the housing adjacent the front wall in communication with the lower end of said collecting hopper and in communication with the exterior of the front wall of the housing, and a discharge hopper positioned below and in communication with said second screen for receiving the unpopped kernels.

2. A corn popping machine comprising a closed housing including a front wall, a fixed inclined floor extending across the interior of said housing intermediate the top and bottom thereof and having its lower end spaced from said front wall, an opening formed in said floor extending inwardly from said lower end thereof and terminating at a point adjacent to the upper end of said floor, a first screen arranged parallel to said floor and overlying a portion of said opening and connected to said floor for reciprocating movement, a second screen arranged parallel to said floor and overlying the remaining portion of said opening and fixedly secured to said floor, the perforations in said first screen being of a size to retain the popped and unpopped kernels of corn and the perforations in said second screen being of a size to retain the popped kernels and permit the passage of the unpopped kernels therethrough, a vertically disposed supply hopper positioned above said first screen and having its lower end located adjacent the upper end of said first screen, radiant heating means secured to said housing beneath the portion of said opening accommodating said first screen, a heat reflector bridging said opening and facing said first and second screens and said heating means, a collecting hopper arranged between the lower end of said floor and said front wall and beneath said lower end of said floor for receiving the popped kernels, a receptacle positioned within the housing adjacent the front wall in communication with the lower end of said collecting hopper and in communication with the exterior of the front wall of the housing, a discharge hopper positioned below and in communication with said second screen for receiving the unpopped kernels, and a gate valve extending transversely through said collecting hopper and slidably supported therein for reciprocatory movement to control the discharge of the popped kernels.

3. A corn popping machine comprising a closed housing including a front wall, a fixed inclined floor extending across the interior of said housing intermediate the top and bottom thereof and having its lower end spaced from said front wall, an opening formed in said floor extending inwardly from said lower end thereof and terminating at a point adjacent to the upper end of said floor, a first scheen arranged parallel to said floor and overlying a portion of said opening and connected to said floor for reciprocating movement, a second screen arranged parallel to said floor and overlying the remaining portion of said opening and fixedly secured to said floor, the perforations in said first screen being of a size to retain the popped and unpopped kernels of corn and the perforations in said second screen being of a size to retain the popped kernels and permit the passage of the unpopped kernels therethrough, a vertically disposed supply hopper positioned above said first screen and having its lower end located adjacent the upper end of said first screen, radiant heating means secured to said housing beneath the portion of said opening accommodating said first screen, a heat reflector bridging said opening and facing said first and second screens and said heating means, a fixed plate positioned in superimposed spaced relation with respect to the portion of said first screen adjacent to the lower end of said supply hopper and forming with said screen portion a restricted passage for controlling the flow of unpopped kernels from the supply hopper to said first screen, a collecting hopper arranged between the lower end of said floor and said front wall and beneath said lower end of said floor for receiving the popped kernels, a receptacle positioned within the housing adjacent the front wall in communication with the lower end of said collecting hopper and in communication with the exterior of the front wall of the housing, a discharge hopper positioned below and in communication with said second screen for receiving the unpopped kernels, and a gate valve extending transversely through said collecting hopper and slidably supported therein for reciprocatory movement to control the discharge of the popped kernels.

4. A corn popping machine comprising a closed housing including a front wall, a fixed inclined floor extending across the interior of said housing intermediate the top and bottom thereof and having its lower end spaced from said front wall, an opening formed in said floor extending inwardly from said lower end thereof and terminating at a point adjacent to the upper end of said floor, upstanding flanges arranged perpendicularly with respect to said lower end of said floor on opposite sides of said opening and secured to said floor in parallel relation and together forming guide rails, a first screen arranged parallel to said floor and overlying a portion of said opening and slidably supported in said guide rails, means connected to said first screen for imparting reciprocating movement to the latter, a second screen arranged parallel to said floor and overlying the remaining portion of said opening and fixedly secured to said floor, the perforations in said first screen being of a size to retain the popped and unpopped kernels of corn and the perforations in said second screen being of a size to retain the popped kernels and permit the passage of the unpopped kernels therethrough, a vertically disposed supply hopper positioned above said first screen and having its lower end located adjacent the upper end of said first screen, radiant heating means secured to said housing beneath the portion of said opening accommodating said first screen, a heat reflector bridging said opening and facing said first and second screens and said heating means, a fixed plate positioned in superimposed spaced relation with respect to the portion of said first screen adjacent to the lower end of said supply hopper and forming with said screen portion a restricted passage for controlling the flow of unpopped kernels from the supply hopper to said first screen, a collecting hopper arranged between the lower end of said floor and said front wall and beneath said lower end of said floor for receiving the popped kernels, a receptacle positioned within the housing adjacent the front wall in communication with the lower end of said collecting hopper and in communication with the exterior of the front wall of the housing, a discharge hopper positioned below and in communication with said second screen for receiving the unpopped kernels, and a gate valve extending transversely through said collecting hopper and slidably supported therein for reciprocatory movement to control the discharge of the popped kernels.

CLIO G. HAWKS.

REFERENCES CITED

The following references are of record in the file of this patent:

UNITED STATES PATENTS

| Number | Name | Date |
| --- | --- | --- |
| 1,586,950 | Hartman | June 1, 1926 |
| 1,621,113 | Hill | Mar. 15, 1927 |
| 1,839,671 | Hale | Jan. 5, 1932 |
| 2,134,088 | Obdyke | Oct. 25, 1938 |
| 2,263,866 | Barber | Nov. 25, 1941 |